United States Patent [19]

Geithman et al.

[11] 4,355,222
[45] Oct. 19, 1982

[54] INDUCTION HEATER AND APPARATUS FOR USE WITH STUD MOUNTED HOT MELT FASTENERS

[75] Inventors: Glenn A. Geithman, Renton; Donald F. Olsen, Hobart, both of Wash.

[73] Assignee: The Boeing Company, Seattle, Wash.

[21] Appl. No.: 261,865

[22] Filed: May 8, 1981

[51] Int. Cl.³ .......................... H05B 6/14; H05B 6/40
[52] U.S. Cl. .............................. 219/10.57; 219/10.77; 219/10.79; 219/10.53; 219/10.43; 219/10.49 R; 156/273.9
[58] Field of Search ............... 219/10.57, 10.75, 10.77, 219/10.79, 10.67, 10.53, 10.49 R, 10.43; 156/272, 273, 274, 275, 380

[56] References Cited

U.S. PATENT DOCUMENTS

| | | | |
|---|---|---|---|
| 2,836,694 | 5/1958 | Emerson | 219/10.75 X |
| 3,727,022 | 4/1973 | Hamilton | 219/10.57 X |
| 3,845,268 | 10/1974 | Sindt | 219/10.57 X |
| 4,133,095 | 1/1979 | Lewis et al. | 219/10.57 X |
| 4,139,408 | 2/1979 | Kobetsky | 219/10.53 X |
| 4,163,884 | 8/1979 | Kobetsky | 219/10.53 X |
| 4,191,875 | 3/1980 | Cunningham | 219/10.77 X |
| 4,248,653 | 2/1981 | Gerber | 219/10.57 X |

FOREIGN PATENT DOCUMENTS 52-62745  5/1977  Japan ......................... 219/10.75

Primary Examiner—B. A. Reynolds
Assistant Examiner—Philip H. Leung
Attorney, Agent, or Firm—Conrad O. Gardner; B. A. Donahue

[57] ABSTRACT

An induction heater probe for use with stud mounted hot melt fasteners, the induction heater probe having an outer ferrite cup core portion and an inner hollow cylindrically shaped ferrite core portion with an aperture configured to receive the stud portion of a hot melt fastener. Induction windings surround the inner cylindrical core portion, the housing supporting the ferrite cup core portion including an adjustment screw for limiting the entry of the stud portion of the fastener into the core hole in the inner hollowed cylinder-shaped ferrite core portion of the pot core in the induction heater probe. The pot core ferrite material provides a low reluctance path for the magnetic field lines thereby shielding the stud portion of the hot melt fastener. A coupling coil surrounding the inner hollow cylindrical-shaped ferrite core portion is excited with 35 kHz energy for a period of about ten seconds thereby heating the fastener to approximately 600° F. and melting the adhesive wafer portion of the stud mounted hot melt fastener.

5 Claims, 8 Drawing Figures

INDUCTION HEATER AND APPARATUS FOR USE WITH STUD MOUNTED HOT MELT FASTENERS

This invention relates to induction heating apparatus and systems and more particularly to an induction heating system having a multiturn coupling coil connected in circuit with an oscillator circuit for use in induction heating of stud mounted hot melt fasteners.

Heretofore, U.S. Pat. No. 3,845,268, issued Oct. 29, 1974, and assigned to The Boeing Company, assignee of the present application, is exemplary of induction heater probe and system for utilization in the application of heat in the bonding of flat hot melt fasteners to interior structure. The aforementioned prior art structure included an induction heater probe wherein the work coil comprised about 25 turns of insulated copper strap material. Further, power on the order of several hundred watts at a frequency of about 35 kHz was supplied to the work coil by the power oscillator. Operating procedure in the aforementioned prior art patent literature reference consisted of positioning the work coil over the fastener and energizing the coil for a period of about ten seconds. The resulting induced eddy currents heated the fastener through ohmic losses to a temperature of about 500° F. to 600° F. thereby causing the adhesive to become molten.

In contrast to the aforementioned induction heater apparatus and system of U.S. Pat. No. 3,845,268, the present induction heater probe may be utilized with the flat plate type hot melt fastener shown in U.S. Pat. No. 3,845,268 and also with the present stud mounted hot melt fastener of the flat hot melt type having a threaded stud mounted normal to its surface.

It is accordingly an object of the present invention to provide induction heater probe means for mounting stud mounted hot melt type fasteners to interior structures while ensuring that the stud portion of the fastener receives only minimum heat from the induction heater probe.

In accordance with a preferred embodiment of the present invention, the induction heater probe assembly includes an outer ferrite cup core portion and an inner hollow cylinder-shaped ferrite core portion having a hole configured to receive the stud portion of the fastener. Induction windings are wound around the inner cylindrical core portion, an adjustment screw is utilized for limiting the extent of entry of the stud into the hole in the cylindrical core portion, while 35 kHz energy for a period of about ten seconds is utilized to excite the induction windings. A further feature of the present system includes an electromagnetic holding circuit for retaining a fastener in the induction heater probe prior to the application of 35 kHz excitation of the induction windings.

Other objects, features, and advantages of the present invention will become apparent from the following description read on the accompanying drawings wherein.

Figure 3:
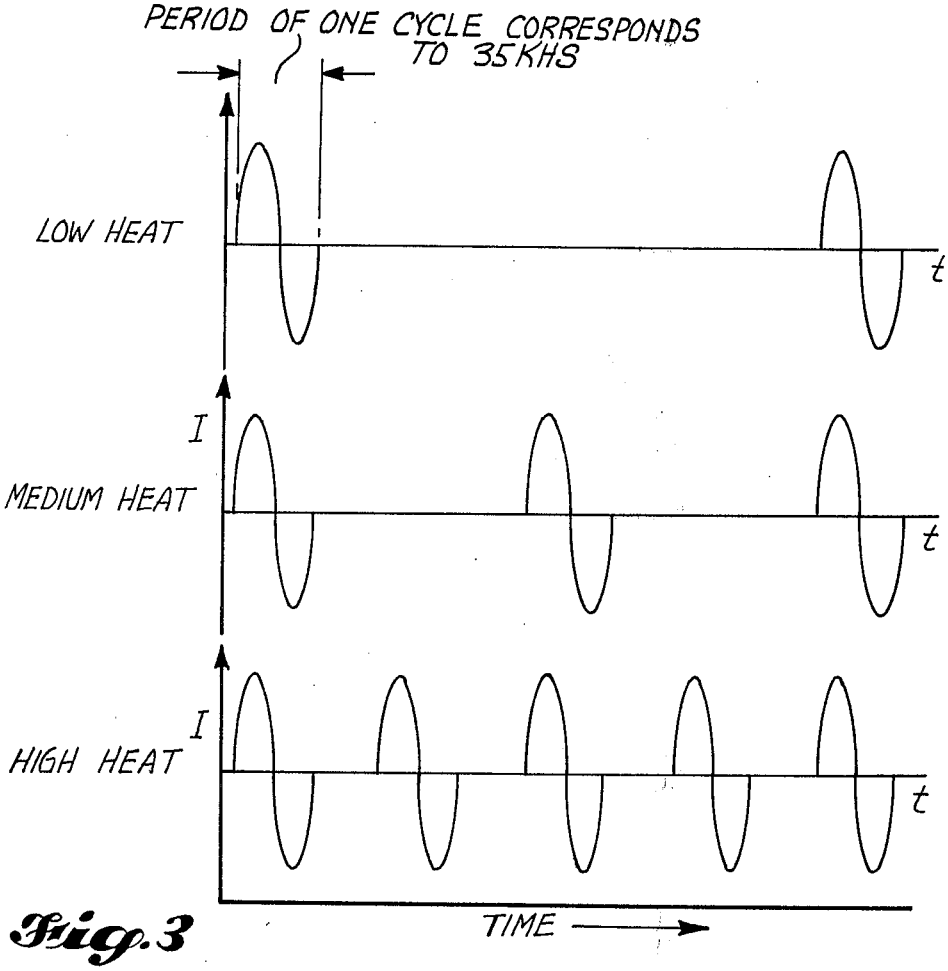
FIG. 3 is illustrative of turned control to the work coil as a function of time to provide low heat, medium heat and high heat settings.

Turning now to the induction heater portion of the probe assembly, the core structure 10 is seen to include an outer ferrite cup core portion 12 surrounding an inner hollow cylinder-shaped ferrite core portion 14 having a core hole 16 coaxially disposed therein. The inner hollow cylinder-shaped ferrite core portion 14 is seen surrounded by induction windings 18 which are connected to induction winding terminals 20 and 22. Core structure 10 is seen in cross-sectional view in FIG. 2 where hole 16 is seen to accommodate stud limiting screw member 21, stud mounted screw portion 2 of stud mounted hot melt fastener 24 being seen extending in hole 16 in a manner providing an air gap and consequent good thermal barrier between fastener 24 and core portion 10 of the induction heater probe assembly. The amount of heat applied to stud mounted hot melt fastener 24 is controlled by the pulse repetition rates which vary the duty cycle of current flowing in the induction coil windings 18 as seen in FIG. 3. As can be seen in FIG. 3, proceeding down from the first graph labeled low heat through medium heat to the bottom graph labeled high heat, as the pulse repetition rate increases more current flows through the coil windings 18 resulting in increased heat application to the fastener 24. Turning briefly to the schematic circuit diagram of FIGS. 7A and 7B it will be observed that heat is controlled by pulse repetition rate to SCR 123 which varies the duty cycle and in fact increases the duty cycle as shown proceeding from low heat in the upper graph to high heat in the lower graph. Also, in the FIG. 7B portion of the schematic diagram it will be noted that pins 3 and 5 show a jumper connection which results in low heat application while when pins 3 and 6 are jumpered instead a medium heat application is applied, and when pins 3 and 7 are jumpered a high heat application is called for. This jumpering as hereinafter described in connection with the operation of the system selects which of the three trim pots is selected as a consequence of the energization respectively of relays K3, K4 or K5.

Figures 1, 2:
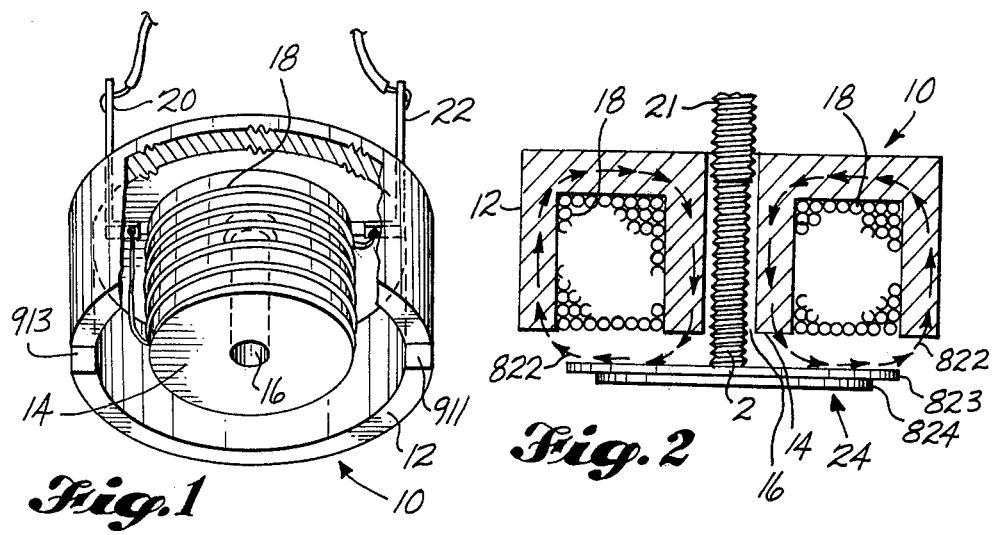
FIG. 1 is a perspective view partly in section of the core structure of the induction heater probe assembly showing the outer ferrite cup core portion and the inner hollow cylinder-shaped ferrite core portion surrounded by the induction windings.
FIG. 2 is a sectional view of the core portion shown in FIG. 1 illustrative of adjustment screw function as a mechanical stop for the stud portion of the stud mounted hot melt fastener, this sectional view further illustrative of the air gap providing a thermal barrier between fastener and core portion of the induction heater probe.
Figure 4:
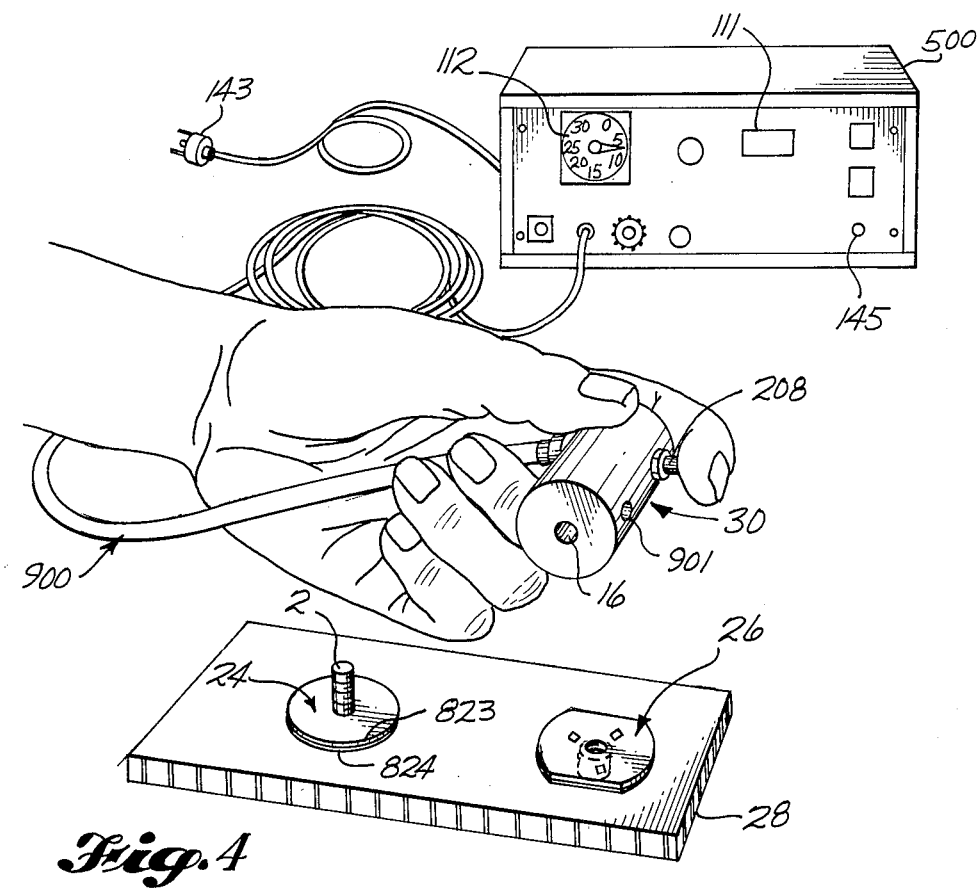
FIG. 4 is a perspective view of operator utilization of the present induction heater apparatus and system detailing probe maneuver for use on a flat plate type fastener and a stud mounted type hot melt fastener.
Figures 5, 6:
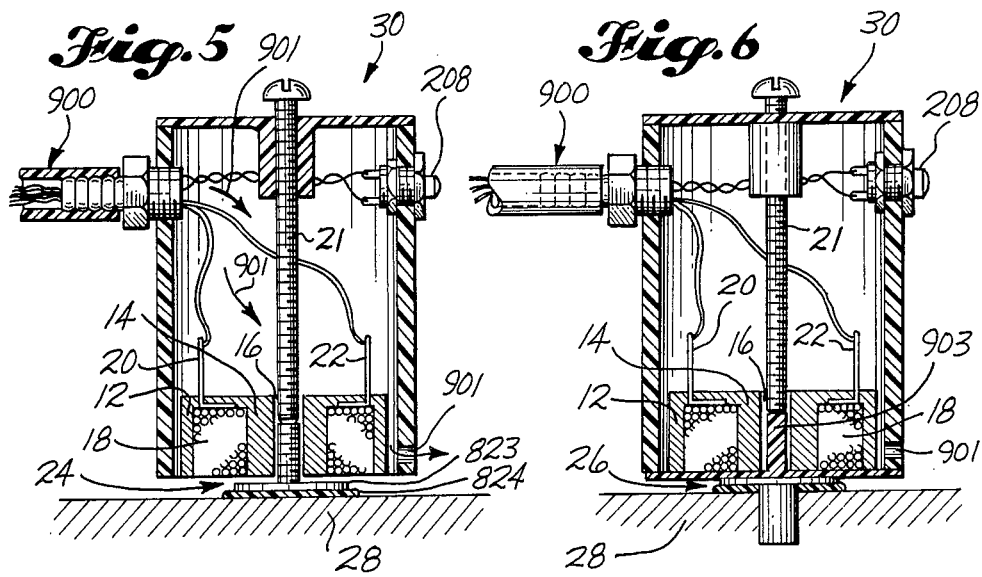
FIG. 5 is a sectional view of the present probe structure positioned for use with a stud mounted hot melt type fastener.
FIG. 6 is a sectional view of the present probe positioned for use on a work piece having a flat plate type hot melt fastener; and, FIGS. 7A and 7B, when taken together, comprise an electrical schematic diagram of the present induction heater system including the induction heater windings in circuit therewith.

Turning now to FIG. 4, a general layout of the scene showing the equipment and work piece 28 is deemed helpful. The operator holds the induction heater probe assembly 30 in his hand at 900, then disposes the assembly 30 over the stud portion 22 of stud mounted hot melt fastener 24 seated on work piece 28 with the hole 16 of the inner hollow cylinder-shaped ferrite core portion of the core structure receiving stud portion 22. Turning now to FIG. 5, a clear view can be seen in cross section of the relationship of the interior parts of induction heater probe 30 with respect to fastener 24. As hereinbefore discussed in connection with the description of FIG. 2, it can be seen how adjustment screw 21 threaded into and supported by the top portion of induction heater probe housing 30 limits the extent of entry of stud portion 22 into the hole 16 of inner hollow cylinder-shaped ferrite core portion 14 of the core structure within induction heater probe housing 30. Air exhaust hole 901 can be seen in the side of induction heater probe housing 30 from FIG. 4 and also the relationship of air exhaust hole 901 can be seen with respect to the airflow path from connecting cable 900 through the interior work coil 18 region (see arrows 901 for direction of flow towards air exhaust exit 901). When the operator desires to initiate the heating of stud mounted hot melt fastener 24, he energizes push button 208 on the side of induction heater probe housing 30. Push button switch 208 is shown connected between terminals 3 and 4 of connector 800 in the schematic diagram portion shown in FIG. 7B and hereinafter described in connection with circuit operation and circuit description. In order to couple 35 kHz electrical energy into a flat type hot melt fastener 26 as shown in FIG. 4 and in cross section in FIG. 6, a short Teflon (a synthetic resin polymer material) or ceramic cylinder 903 is inserted into hole 16 ahead of adjustment screw 21 as shown in FIG. 6 to ensure that a predetermined air gap is maintained as in FIG. 5 between the upper surface of flat hot melt fastener 26 and the bottom surface of housing assembly 30. It can thus be seen that the present induction heater probe for use with stud mounted hot melt fasteners 24 may also be utilized with the flat type hot melt fastener 26 (also denominated by numeral 37 in hereinbefore-mentioned U.S. Pat. No. 3,845,268). Also, in passing it may be noted that the present induction heater probe housing 30 with its interior disposed magnetic core structure supporting induction windings 18 results in a magnetic field during the heating process which provides heating effects concentrated in the region of the flat plate portion of the stud mounted hot melt fastener 24 as seen in FIG. 5. In contrast, induction heater probe 28 as seen in FIG. 1 of U.S. Pat. No. 3,845,268 if it included a clearance hole along the central axis of the coil would result in excessive heating in the stud region 22 of fastener 24. Heating effect of induction heater probe 30 shown in the present application due to the hereinbefore-described core assembly structure for supporting induction windings 18 results in concentration of magnetic flux in the region of the flat plate portion of the fastener as seen from the flux paths charted in FIG. 2 and denoted by the numerals 822 which pass through the conductive plate portion 823 of stud mounted hot melt fastener 24 causing melt of hot melt surface 824 abutted against the work piece 28 as seen in FIG. 4. Turning briefly to FIG. 1, it should be noted that the side walls of outer ferrite cup core portion 12 include longitudinal side slots 911 and 913 disposed parallel with the center hole 16 axis. One of side slots 911 or 913 is aligned with exhaust hole 901 shown in FIG. 4 to provide airflow and cooling from the inner region of induction windings 18. Proceeding now with more specificity as to the arrangement of inductive windings 18, it should be noted that these windings 18 about inner hollow cylinder-shaped ferrite core portion 14 of the inner magnetic core assembly comprise ten turns of #16 magnet wire wound around core portion 14 thereby resulting in an inductance of approximately ten microhenries. The utilization of ferrite material provides a low reluctance path for the magnetic field lines thereby providing an effective shielding of stud portion 22 of fastener 24 as hereinbefore discussed in connection with the description of FIG. 2. Test results indicated substantially no heating taking place in the region of stud portion 22 of fastener 24. Test results further obtained indicated a preferred adjustment screw 21 setting for an air gap of about 0.060 inches between the exposed surface 823 of fastener 24 and the bottom surface of inner hollow cylinder-shaped ferrite core portion 12 as seen in FIG. 2. Also, the aforementioned air gap provided a good thermal barrier between fastener and probe which resulted in cool operation. The aforementioned effect of stud 2 shielding, as seen in FIG. 2, is provided by the ferrite material of the core structure which provides a low reluctance path for the magnetic field. The large air gap provided outside the magnetic field path limits the magnetic field path thereby making selection of ferrite material less critical, this being also a result of the relatively low frequencies involved (approximately 30 kHz). The material selected for the induction heater probe core structure comprising outer ferrite cup core portion 12 and inner hollow cylinder-shaped ferrite core portion 14 comprised Ferroxcube 3C8 material (manufactured by Ferroxcube Corporation of 5083 Kings Highway, Saugerties, N.Y. 12477) which was selected because of its characteristics for having a very high saturation flux density consistent with a high magnetic field in the present core structure region, in excess of 1250 ampere-currents. The aforementioned air gap between induction heater probe and top of the fastener surface should be actually made as small as possible (0.060 inches) to provide for the best possible magnetic coupling while at the same time providing a good thermal barrier between the hot melt fastener and the induction heater probe.

CIRCUIT SCHEMATIC OF INDUCTION HEATER SYSTEM

First it should be observed that induction heater probe connector 800 provides for connection of the induction windings 18 to terminals 1 and 2 of connector 800, and the push-button switch for initiating heating at numeral 208 is the push button hereinbefore discussed and shown in FIGS. 4, 5 and 6 which push button 208 is found disposed on the outer surface of induction heater probe housing 30. Assembling FIGS. 7A and 7B together and proceeding to FIG. 7A, it would be noted that 60 Hz, 115 VAC power enters the present system through connectors 143 and is then coupled through fuse 119, main power switch 145, supplies power to fan 114 (for causing air to flow through cabinet 500 and cooling the interior disposed electronic system of FIGS. 7A and 7B), low voltage power supply 212 and, as seen in FIG. 7B, air pressure interlock switch 157 which switch 157 prevents accidental energization of heating coil 18 prior to generation of airflow for cooling via an external air source, not shown.

Isolation transformer 107 is energized by the operator pushing push button 208 on the side of induction heater probe housing 30 (see FIG. 4). This energization of isolation transformer 107 occurs via solid state relays K1 and K2 and reset timer 112. Isolation transformer 107 in circuit with bridge rectifier circuit 122 and filter capacitor 125 serves to provide a source of d.c. power (approximately 170 VDC) which is isolated from the line for safety precaution. The aforementioned d.c. power is applied to induction coil windings 18 which are in turn connected through commutating capacitor 126 through a silicon-controlled rectifier 123 back to the negative return line.

Selection of the commutating capacitor 126 is extremely critical since its value (shown as 3 ufd), taken together with the value of the inductance of coil 18 ten microhenries, result in the formation of a tuned circuit which determines the natural resonant frequency of the oscillator (approximately 30 kHz). Further, commutating capacitor 126 is required to be capable of sustaining the high a.c. currents involved, e.g., 25 amps. Power to the induction coil 18 is controlled by varying the gate turn-on pulse repetition rate to SCR 123. This corresponds to changing the duty cycle (seen hereinbefore in FIG. 3). The pulse repetition frequency can range from zero to a maximum of 7,500 Hz.

During the off interval of SCR 123, the commutating capacitor 126 is recharged via inductor 128 and diode 124. Diode 224 is used to clamp the reverse voltage across SCR 123 to zero.

Gate drive pulses to SCR 123 are generated on circuit board 866 by means of voltage controlled oscillator 119. Three frequencies, i.e., power settings, are available by means of selecting jumpers as hereinbefore mentioned to make connections to connector 800. This further means that three different types of work coils may have unique power settings associated with them, corresponding to their special applications.

Depressing push button 208 on induction heater probe housing 30 enables the oscillator by means of reset timer 112. Reset timer 112 is adjustable from zero to 30 seconds. Releasing aforementioned push button 208 by the operator resets reset timer 112 (see FIG. 4) to zero. An audible warning device 113 (FIG. 7A) signals the operator that the heating cycle is completed while electromagnetic counter 111 provides the operator with a count of the number of fasteners installed.

Figure 7A:
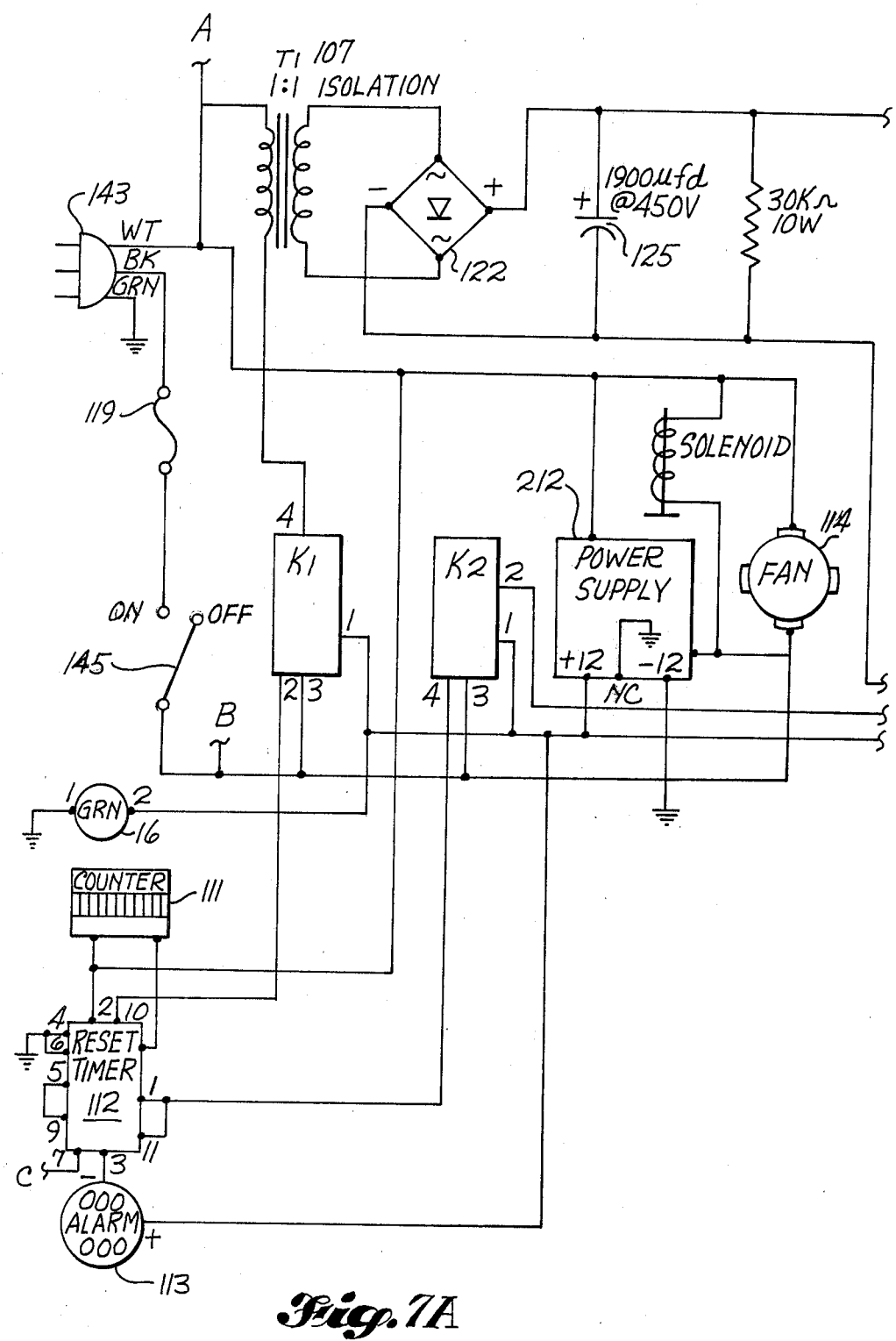
Figure 7B:
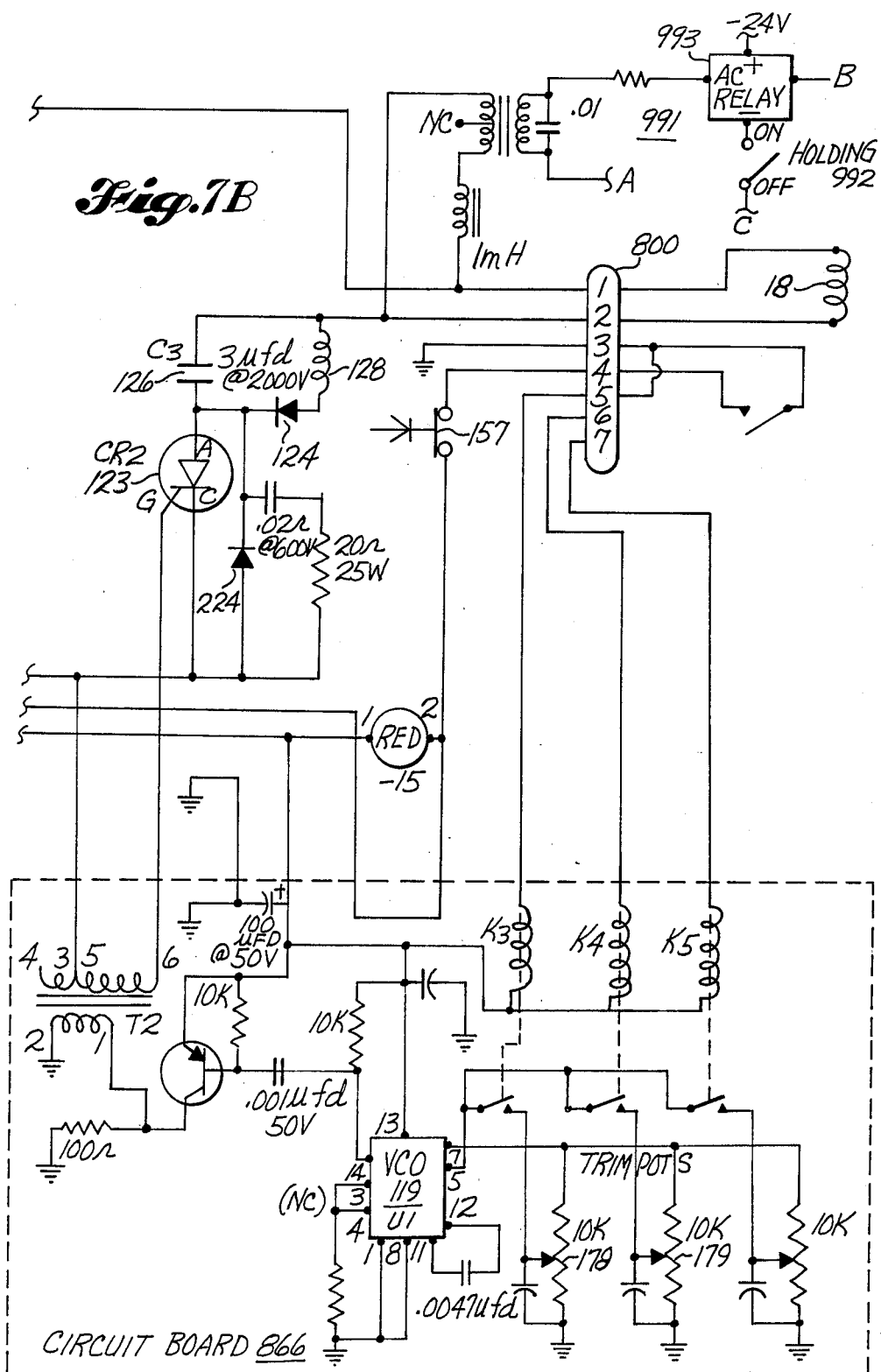

A further unique feature of the present induction heater system shown in schematic form in FIGS. 7A and 7B is the electromagnetic holding feature provided by electromagnetic holding circuit 991 which is actuated by the operator closing holding switch 992 thereby energizing relay 993 and providing the application of 60 cycle energy to terminals 1 and 2 of connector 800 which results in the application of a magnetic field by coil 18. This electromagnetic holding feature for generating a magnetic field in coil 18 of induction heater probe assembly 30 enables the operator seen holding probe assembly 30 in FIG. 4 to insert the stud portion 2 of stud mounted hot melt fastener 24 into hole 16 prior to positioning the fastener on the work piece 28 so that simple motion of the induction heater probe toward the work piece 28 will keep fastener 24 in position within induction heater probe assembly 30 and enable its easy manipulation into a seated position as shown in FIG. 4 without permitting it to drop out of induction heater probe 30 prior to pressing against work piece 28.

We claim:

1. In combination:
    an induction heater probe having a ferrite core structure including an outer ferrite cup core portion surrounding an inner hollow cylinder-shaped portion surrounded by induction windings, said inner hollow cylinder-shaped portion adapted to receive a stud portion of a flat plate hot melt fastener;
    an electromagnetic holding circuit for selectively applying an electromagnetic force to the flat plate portion of a flat plate hot melt fastener upon insertion of the stud portion of the flat plate hot melt fastener within said inner hollow cylinder-shaped portion of said flat plate hot melt fastener; and,
    a power oscillator circuit for selectively generating eddy current flow in the flat plate portion of a flat plate hot melt fastener upon insertion of the stud portion of the flat plate hot melt fastener within said inner hollow cylinder-shaped portion of said flat plate hot melt fastener.

2. The combination of claim 1 wherein said electromagnetic force has an a.c. frequency equal to the power source frequency of said power oscillator circuit.

3. An induction heater probe assembly for inducing eddy current flow in a hot melt fastener having a flat plate portion comprising:
    a cylindrically shaped housing having a closed top portion for supporting an adjustable screw coaxially disposed with respect to said cylindrically shaped housing;
    a ferrite core structure coaxially disposed within said cylindrically shaped housing for receiving said adjustable screw, said ferrite core structure including an outer ferrite cup core portion and an inner hollow cylinder-shaped ferrite core portion;
    means including said adjustable screw for maintaining a predetermined air gap between said cylindrically shaped housing and the flat plate portion of said hot melt fastener;
    induction windings surrounding said inner hollow cylinder-shaped ferrite core portion;
    means coupled to said induction windings for varying the duty cycle of eddy current inducing current pulses flowing through said induction windings; and,
    said means coupled to said induction windings including a voltage controlled oscillator for controlling the firing time of a silicon controlled rectifier.

4. The induction heater probe of claim 3 wherein said outer ferrite cup core portion includes side slots for permitting air flow from the inner wall of said housing to the outer wall of said inner hollow cylinder-shaped ferrite core portion and through an aperture in the wall of said housing to ambient air surrounding the outside wall of said housing.

5. The induction heater probe of claim 4 wherein an airflow interlock switch is connected in series circuit with push button power oscillator ON-OFF control for controlling current flow in said induction windings thereby preventing application of current flow through said induction windings without said airflow.

* * * * *